United States Patent
Matsushita (10) Patent No.: US 10,731,703 B2
(45) Date of Patent: Aug. 4, 2020

(54) TAPERED ROLLER BEARING

(71) Applicant: NTN CORPORATION, Osaka (JP)

(72) Inventor: Tomoki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/329,261

(22) PCT Filed: Aug. 25, 2017

(86) PCT No.: PCT/JP2017/030619
§ 371 (c)(1),
(2) Date: Feb. 28, 2019

(87) PCT Pub. No.: WO2018/047641
PCT Pub. Date: Mar. 15, 2018

(65) Prior Publication Data
US 2019/0219098 A1    Jul. 18, 2019

(30) Foreign Application Priority Data
Sep. 6, 2016 (JP) .................................. 2016-173630

(51) Int. Cl.
*F16C 19/36* (2006.01)
*F16C 33/36* (2006.01)
(Continued)

(52) U.S. Cl.
CPC ............ *F16C 19/364* (2013.01); *F16C 19/36* (2013.01); *F16C 19/38* (2013.01); *F16C 19/383* (2013.01);
(Continued)

(58) Field of Classification Search
CPC .... F16C 19/225; F16C 19/364; F16C 19/383; F16C 33/36; F16C 33/366; F16C 33/467;
(Continued)

(56) References Cited

U.S. PATENT DOCUMENTS 5,752,775 A * 5/1998 Tsutsui ...................... B24B 5/01
384/568
6,318,897 B1* 11/2001 Shitsukawa ........... F16C 19/364
29/898.066

(Continued)

FOREIGN PATENT DOCUMENTS

JP  2001-65574   3/2001
JP  2005-155763  6/2005
(Continued)

OTHER PUBLICATIONS

International Search Report dated Nov. 7, 2017 in International (PCT) Application No. PCT/JP2017/030619.
(Continued)

*Primary Examiner* — Marcus Charles
(74) *Attorney, Agent, or Firm* — Wenderoth, Lind & Ponack, L.L.P.

(57) ABSTRACT

A tapered roller bearing includes inner and outer rings including raceway surfaces having tapered shapes on their outer and inner peripheries, respectively, tapered rollers between the raceway surfaces, and a retainer configured to receive the tapered rollers. At least the raceway surface of the inner ring includes cut crowning of a complex curve including a center curve and end portion curves formed on both sides of the center curve each have a curvature radius smaller than a curvature radius of the center curve. The tapered rollers each have a rolling surface including a straight portion and logarithmic crowning portions formed on both sides of the straight portion. When the raceway surface of the inner ring has an effective raceway surface width represented by LG, and the straight portion of the rolling surface of the tapered roller has a width represented by LW1, $0.7 \leq LW1/LG < 0.95$ is satisfied.

1 Claim, 6 Drawing Sheets

(51) Int. Cl.
    *F16C 19/38*    (2006.01)
    *F16C 33/58*    (2006.01)
(52) U.S. Cl.
    CPC .............. *F16C 33/36* (2013.01); *F16C 33/58* (2013.01); *F16C 33/585* (2013.01); *F16C 2240/50* (2013.01); *F16C 2326/01* (2013.01)
(58) Field of Classification Search
    CPC ................ F16C 33/585; F16C 2240/50; F16C 2240/70; F16C 2361/61
    USPC ......... 384/450, 560, 564–565, 568, 571–572
    See application file for complete search history.

(56) References Cited

U.S. PATENT DOCUMENTS

| | | | | |
|---|---|---|---|---|
| 6,328,477 | B1* | 12/2001 | Tsujimoto | F16C 19/225 384/450 |
| 6,390,685 | B1* | 5/2002 | Shimomura | F16C 19/26 384/450 |
| 6,502,996 | B2* | 1/2003 | Joki | F16C 19/364 384/450 |
| 6,547,443 | B2* | 4/2003 | Hanai | F16C 19/225 384/450 |
| 8,480,308 | B2* | 7/2013 | Masuda | F16C 19/225 384/564 |
| 8,641,290 | B2* | 2/2014 | Kawaguchi | F16C 19/364 384/450 |
| 2007/0041675 | A1* | 2/2007 | Matsuyama | F16C 19/364 384/571 |
| 2007/0041677 | A1 | 2/2007 | Masuda et al. | |

FOREIGN PATENT DOCUMENTS

| | | |
|---|---|---|
| JP | 3731401 | 1/2006 |
| JP | 2007-051714 | 3/2007 |
| JP | 2007-51715 | 3/2007 |
| JP | 2007-170418 | 7/2007 |
| JP | 2008-014473 | 1/2008 |
| JP | 2010-106974 | 5/2010 |
| JP | 5037094 | 9/2012 |
| JP | 2014-52069 | 3/2014 |

OTHER PUBLICATIONS

International Preliminary Report on Patentability and Written Opinion of the International Searching Authority dated Mar. 12, 2019 in International (PCT) Application No. PCT/JP2017/030619.
Notice of Reasons for Refusal dated Apr. 17, 2020 in counterpart Japanese Patent Application No. 2016-173630 with English translation.

* cited by examiner

TAPERED ROLLER BEARING

CROSS REFERENCE TO RELATED APPLICATIONS

The present application is a U.S. National Stage Application of International (PCT) Application No. PCT/JP2017/030619, filed on Aug. 25, 2017, which claims priority to Japanese Patent Application No. 2016-173630, filed on Sep. 6, 2016.

TECHNICAL FIELD

The present invention relates to a tapered roller bearing.

BACKGROUND ART

With regard to a tapered roller bearing to be used for automobiles and industrial machines, in order to deal with application of a large load or misalignment, it is required that a contact surface pressure which is generated on raceway surfaces (including rolling surfaces of rollers) of the tapered roller bearing be suppressed to an appropriate magnitude. In order to set a contact surface pressure (edge surface pressure) on the raceway surfaces of the tapered roller bearing to fall within an appropriate range, it is required that crowning be formed. Specifically, attempts have been made with various methods such as a method of forming crowning in each of an inner ring, an outer ring, and rollers and a method of forming large crowning or logarithmic crowning only in the rollers.

Among those methods, as a method which is capable of attaining the most appropriate contact surface pressure and minimizing the stress generated inside the raceway surface to extend a bearing lifetime, there have been proposed, in Patent Document 1, a logarithmic crowning function, which is obtained by modifying the Johns-Gohar's function through introduction of three design parameters thereto, and a roller bearing.

Moreover, according to Patent Document 2, with regard to a crowning shape for attaining an appropriate surface pressure, a range of a crowning drop amount at each of two points of a roller in a generating line direction from a center of a rolling element or a raceway ring is defined irrespective of the crowning shape. Further, according to Patent Document 3, there has been proposed a method of forming logarithmic crowning in a roller and forming logarithmic crowning also in any one of an inner ring and an outer ring.

PRIOR ART DOCUMENTS

Patent Documents

Patent Document 1: JP 5037094 B2
Patent Document 2: JP 3731401 B2
Patent Document 3: JP 2010-106974 A

SUMMARY OF THE INVENTION

Problems to be Solved by the Invention

When the crowning is to be formed, in order to reduce processing cost for the inner ring and the outer ring, it is preferred that crowning of the inner ring and the outer ring be intensively formed in each of the rollers being rolling elements and that single-curve crowning or logarithmic crowning having a large drop amount be formed in each of the rolling surfaces of the rollers. Thus, it has been found that it is also preferred that the raceway surfaces of the inner ring and the outer ring each have a single-curve crowning shape having a small drop amount or a straight shape having no crowning shape.

However, the single-curve crowning reduces a contact length at a center portion in an axial direction. Therefore, there has been found a problem in that, in an elastically deformed state given when a load is received, a surface pressure at the center portion increases, with the result that removal occurs in an early stage and bearing lifetime is reduced.

Moreover, also in the case of the logarithmic crowning, a drop amount at an end portion increases. Therefore, in view of grinding, a certain axial width is required in a crowning region. As a result, the axial width at the center portion is reduced, and thus the surface pressure at the center portion increases. Accordingly, there arises a problem in that the bearing lifetime is slightly reduced. The present invention has been made with the focus on this problem.

In view of the problem described above, the present invention has an object to provide a tapered roller bearing, which is capable of achieving suppression of a contact surface pressure and increase in lifetime at low cost.

Solution to the Problems

As a result of various studies having been conducted to achieve the object described above, the inventor of the present invention has arrived at the present invention based on an idea of a combination of crowning which is capable of maximally achieving suppression of cost and increase in lifetime, with focus on both an aspect of a bearing function, that is, forming logarithmic crowning in each of rolling surfaces of tapered rollers and setting an axial width of a straight portion at a center portion of the rolling surface in a generating line direction and an aspect of a processing cost, that is, setting a crowning shape which does not cause increase in cost also for the raceway surface of the raceway ring.

As a technical measure for achieving the above-mentioned object, according to one embodiment of the present invention, there is provided a tapered roller bearing, comprising: an inner ring comprising a raceway surface having a tapered shape on an outer periphery; an outer ring comprising a raceway surface having a tapered shape on an inner periphery; a plurality of tapered rollers incorporated into a space defined between the raceway surfaces; and a retainer configured to receive the plurality of tapered rollers, wherein at least the raceway surface of the inner ring out of the inner ring and the outer ring comprises cut crowning of a complex curve comprising: a center curve, which is formed at a center portion in a generating line direction of the raceway surface; and end portion curves, which are formed on both sides of the center curve in the generating line direction and each have a curvature radius smaller than a curvature radius of the center curve, wherein the tapered rollers each have a rolling surface comprising: a straight portion, which is formed at a center portion in a generating line direction of the rolling surface; and logarithmic crowning portions, which are formed on both sides of the straight portion in the generating line direction, and wherein, when the raceway surface of the inner ring has an effective raceway surface width represented by LG, and the straight portion of the rolling surface of the tapered roller has a width represented by LW1, $0.7 \leq LW1/LG < 0.95$ is satisfied.

With the configuration described above, suppression of the contact surface pressure in the tapered roller bearing and the increase in lifetime can be achieved at low cost.

It is preferred that, when the logarithmic crowning portion has a drop amount represented by Dr, the tapered roller has a diameter represented by Dw, and the cut crowning of the raceway surface of the inner ring has a drop amount represented by Dc, $0.003 \leq (Dr+Dc)/Dw \leq 0.03$ be satisfied. With this, the edge surface pressure can be set to an appropriate value. Moreover, ease of processing is excellent, and hence manufacturing cost can be reduced.

The tapered roller bearing according to one embodiment of the present invention is to be suitably used for, in particular, a transmission and a differential.

Effects of the Invention

According to the present invention, suppression of the contact surface pressure in the tapered roller bearing and increase in lifetime of the tapered roller bearing can be achieved at low cost.

EMBODIMENTS OF THE INVENTION

Figure 1:
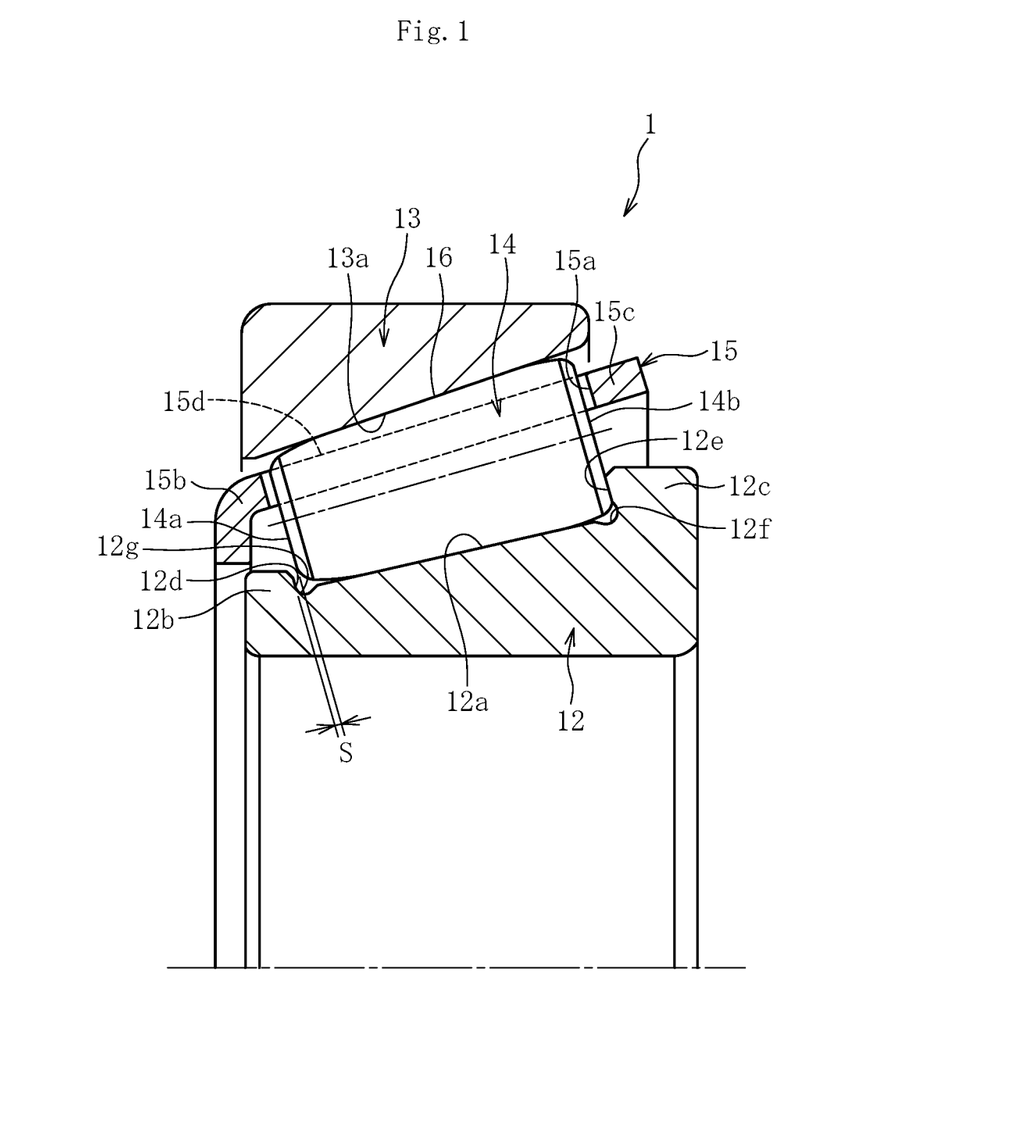
FIG. 1 is a vertical sectional view for illustrating a tapered roller bearing according to one embodiment of the present invention.

With reference to FIG. 1 to FIG. 5, description is made of a tapered roller bearing according to one embodiment of the present invention. FIG. 1 is a vertical sectional view for illustrating the tapered roller bearing according to this embodiment, and is an illustration of a part of the tapered roller bearing in an upper half from a center line.

As illustrated in FIG. 1, a tapered roller bearing 1 comprises an inner ring 12, an outer ring 13, tapered rollers 14, and a retainer 15. The tapered rollers 14 are incorporated between the inner ring 12 and the outer ring 13. The retainer 15 is configured to retain the tapered rollers 14. The inner ring 12 has a raceway surface 12a, a small-flange portion 12b, and a large-flange portion 12c. The raceway surface 12a has a tapered shape and is formed on an outer periphery of the inner ring 12. The small-flange portion 12b is formed on a small-diameter side. The large-flange portion 12c is formed on a large-diameter side. The outer ring 13 has a raceway surface 13a. The raceway surface 13a has a tapered shape and is formed on an inner periphery of the outer ring 13. The plurality of tapered rollers 14 are incorporated between the raceway surface 12a of the inner ring 12 and the raceway surface 13a of the outer ring 13. The tapered rollers 14 are received in pockets 15a of the retainer 15 and are retained at equal intervals in a circumferential direction.

A ground relief portion 12f is formed at a corner portion at which the raceway surface 12a of the inner ring 12 and a large-flange surface 12e of the large-flange portion 12c intersect each other. A ground relief portion 12g is formed at a corner portion at which the raceway surface 12a and a small-flange surface 12d of the small-flange portion 12b intersect each other. The raceway surface 12a of the inner ring 12 has the ground relief portions 12f and 12g. Thus, an effective raceway surface width LG (see FIG. 4) of the raceway surface 12a is smaller than an effective rolling surface width LW (see FIG. 2) of a rolling surface 16 of the tapered roller 14.

Figure 2:
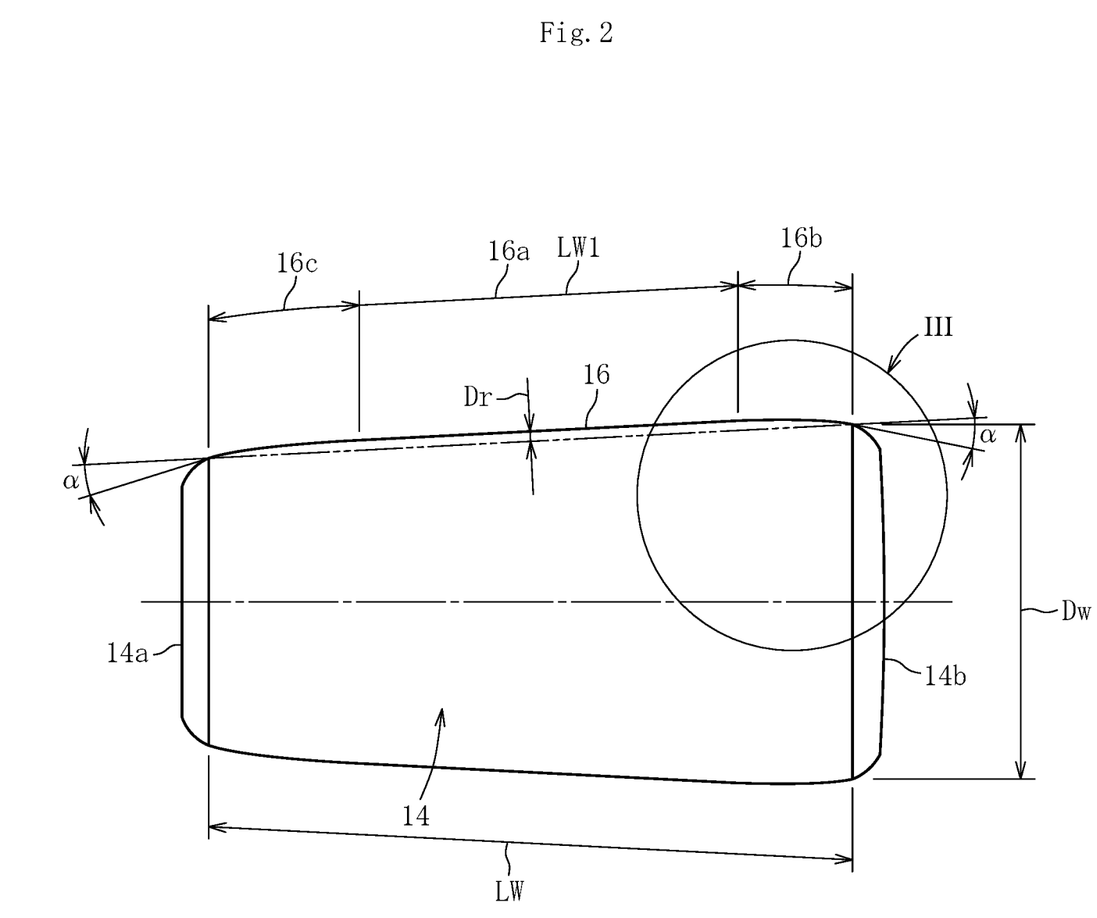
FIG. 2 is an enlarged front view of a tapered roller of FIG. 1.

As illustrated in FIG. 1, the rolling surface 16 having a tapered shape is formed on an outer periphery of the tapered roller 14. A small end surface 14a is formed on the small-diameter side, and a large end surface 14b is formed on the large-diameter side. The large end surface 14b of the tapered roller 14 is received on the large-flange surface 12e of the inner ring 12. As illustrated in FIG. 2, the rolling surface 16 of the tapered roller 14 comprises a straight portion 16a and crowning portions 16b and 16c. The straight portion 16a is formed at a center portion in a generating line direction. The crowning portions 16b and 16c are formed at both end portions in the generating line direction. In FIG. 2, the drop amount of each of the crowning portions 16b and 16c is illustrated with emphasis. The crowning portions 16b and 16c are described later in detail. As illustrated in FIG. 1, the retainer 15 comprises a small-diameter side annular portion 15b, a large-diameter side annular portion 15c, and a plurality of columnar portions 15d connecting the small-diameter side annular portion 15b and the large-diameter side annular portion 15c to each other in the axial direction.

Figure 3:
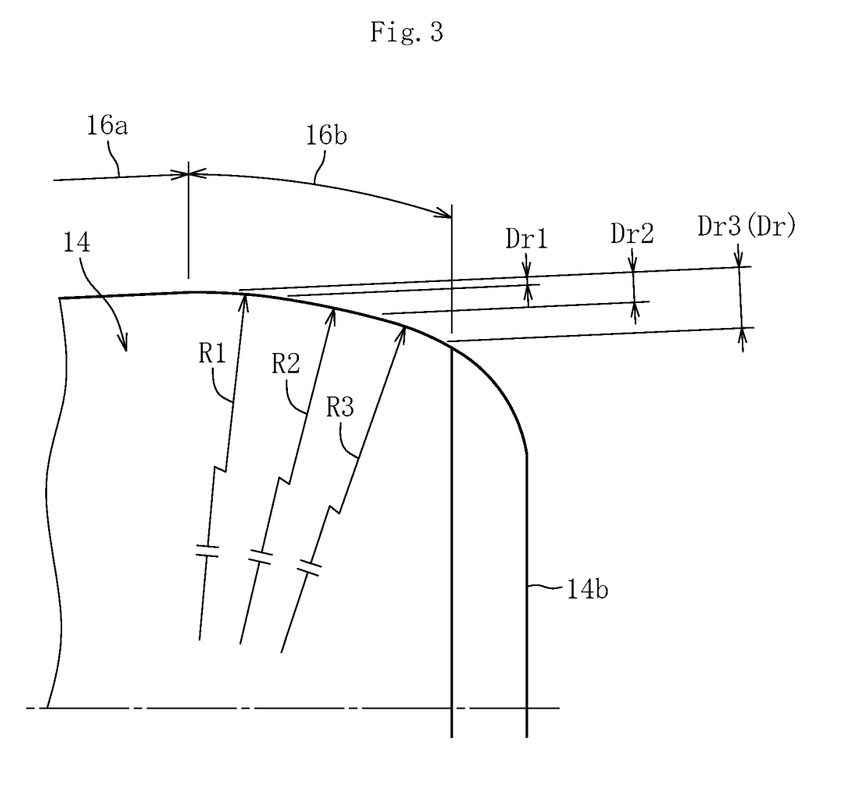
FIG. 3 is an enlarged view for illustrating the portion III of FIG. 2.
Figure 4:
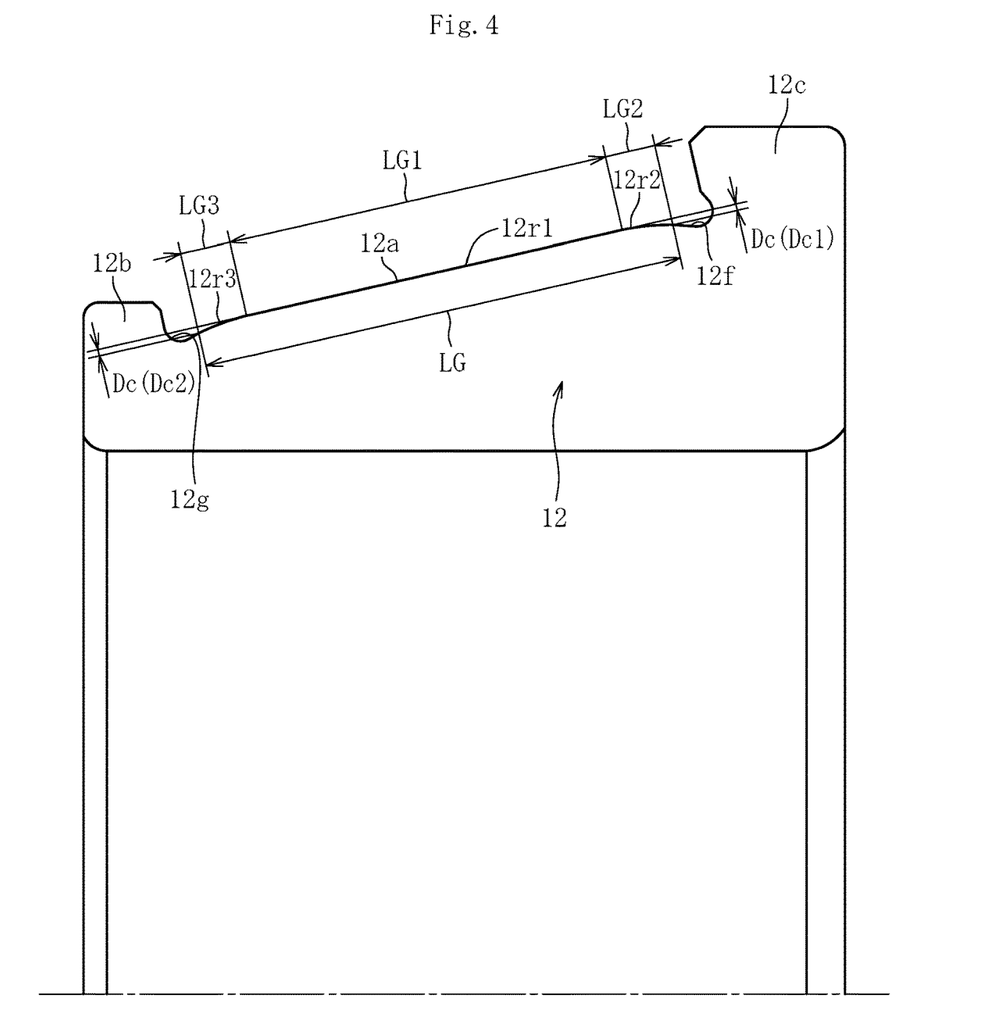
FIG. 4 is an enlarged vertical sectional view for illustrating an inner ring of FIG. 1.
Figure 5:
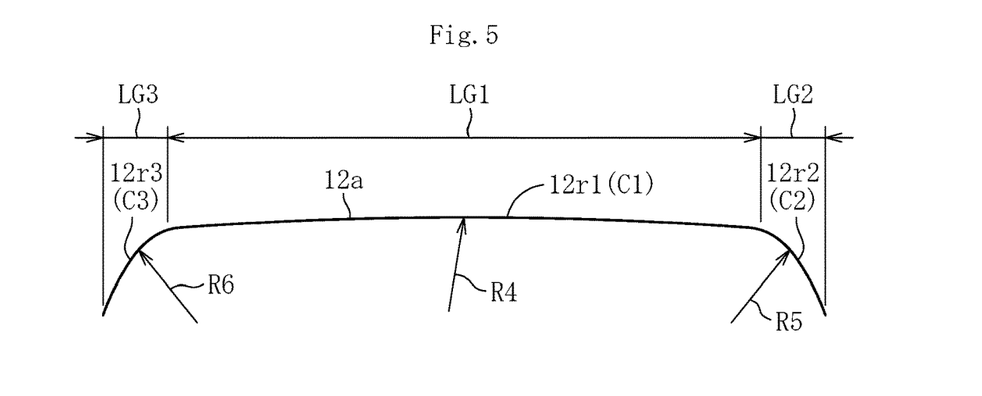
FIG. 5 is a schematic view for illustrating a shape of a raceway surface of the inner ring of FIG. 4 in a generating line direction.

The outline of the tapered roller bearing according to this embodiment is as described above. Next, with reference to FIG. 2 to FIG. 5, description is made of a characteristic configuration of the tapered roller bearing according to this embodiment. FIG. 2 is an enlarged front view of the tapered roller of FIG. 1. FIG. 3 is an enlarged view for illustrating the portion III of FIG. 2. FIG. 4 is an enlarged vertical sectional view for illustrating the inner ring of FIG. 1. FIG. 5 is a schematic view for illustrating a shape of the raceway surface of the inner ring of FIG. 4 in a generating line direction, in which dimensions in a radial direction (up-and-down direction in FIG. 5) are illustrated with a magnification of from about 500 times to 1,000 times with respect to a dimension in the generating line direction.

The characteristic configuration of the tapered roller bearing according to this embodiment has been obtained based on an idea of a combination of crowning which is capable of maximally achieving suppression of cost and increase in lifetime, with focus on both an aspect of a bearing function, that is, forming logarithmic crowning in each of the rolling surfaces of the tapered rollers and setting an axial width of the straight portion at the center portion of the rolling surface and an aspect of a processing cost, that is, setting a crowning shape which does not cause increase in cost also for the raceway surface of the raceway ring. The logarithmic crowning is formed only in the tapered roller, and related-art cut crowning is formed in at least the raceway surface of the inner ring out of the inner ring and the outer ring.

As illustrated in FIG. 2, the rolling surface 16 of the tapered roller 14 comprises a straight portion 16a and logarithmic crowning portions (hereinafter each simply referred to as "crowning portion") 16b and 16c. The straight portion 16a is formed at a center portion in the generating line direction. The crowning portions 16b and 16c are formed at both end portions. The tapered roller 14 has an effective rolling surface width represented by LW, and the straight portion 16a has a width represented by LW1. A diameter of the tapered roller 14 on the large-diameter side corresponds to a roller diameter Dw. The crowning portions 16b and 16c each have a tangent angle α at an end portion thereof.

Now, description is made of the logarithmic crowning formed in the tapered roller 14. The generating line of each of the crowning portions 16b and 16c is determined based on a logarithmic curve of logarithmic crowning expressed by the following expression as an example. This logarithmic crowning expression is cited from Japanese Patent No. 5037094 applied by the applicant of the present application.

$$z(y) = K_1 A \ln \frac{1}{1 - \left\{1 - \exp\left(-\frac{z_m}{K_1 A}\right)\right\} \left(\frac{y-a}{K_2 a} + 1\right)^2}$$ [Expression 1]

A: $=2Q/\pi lE'$
a: Length from an original point O to an end of an effective contact portion
E': Equivalent elastic modulus
$K_1$: Parameter representing a degree of a curvature of crowning
$K_2$: Parameter representing a ratio of crowning length with respect to "a"
l: Length of an effective contact portion in a generating line direction
Q: Load
y: Position of the contact portion in the generating line direction
z(y): Drop amount at an axial position "y"
$z_m$: Parameter representing an optimum value of a maximum drop amount of crowning at an end in an effective length of a roller The design parameters $K_1$, $K_2$, and $z_m$ in the logarithmic crowning expression described above are subjected to design. Description is made of a mathematical optimization method for the logarithmic crowning. Through determination of the design parameter $K_2$ and appropriate selection of $K_1$ and $z_m$ in the function expression expressing the logarithmic crowning, optimum logarithmic crowning can be designed. In general, the crowning is designed so as to reduce the surface pressure of the contact portion or a maximum value of stress. It is assumed that the rolling fatigue lifetime occurs in accordance with the von Mises yield criterion, and the parameters $K_1$ and $z_m$ are selected so as to minimize a maximum value of the von Mises equivalent stress. The parameters $K_1$ and $z_m$ can be selected with use of an appropriate mathematical optimization method. Various algorithms for mathematical optimization methods have been proposed, and the direct search method as one example is capable of executing optimization without use of derivatives of function, and is effective for a case in which an objective function and variables cannot be directly expressed with use of expressions. In this case, the parameters $K_1$ and $z_m$ are determined with use of the Rosenbrock method as one of direct search methods.

The shape of each of the crowning portions 16b and 16c of the tapered roller 14 in this embodiment is the logarithmic curve crowning determined by the expression described above. However, the shape is not limited to that determined by the expression described above, but the logarithmic curve may be determined with use of another logarithmic crowning expression.

The crowning portions 16b and 16c of the tapered roller 14 illustrated in FIG. 2 each have crowning having a shape approximated to the logarithmic curve of the logarithmic crowning determined by the expression described above. With reference to FIG. 3, description is made of details of the logarithmic crowning portion 16b formed on the large end surface 14b side of the tapered roller 14. In FIG. 3, for easy understanding of the drop amount of the crowning portion 16b, more emphasis is given as compared to the tapered roller 14 illustrated in FIG. 2. The crowning portion 16b has a complex arc shape formed by smoothly connecting three arcs having large curvature radii R1, R2, and R3 to the straight portion 16a. As the drop amounts of the crowning portion 16b, there are defined a drop amount Dr1 at a first gate, an intermediate drop amount Dr2 at a second gate, and a maximum drop amount Dr3 at a third gate so that the crowning shape approximated to the logarithmic curve is formed. The drop amount Dr3 corresponds to Dr in Description and Claims. Moreover, the drop amount Dr3 corresponds to $z_m$ in Expression 1 described above. With this, surface pressure distribution in the axial direction can be set uniform while avoiding the edge surface pressure. The drop amount depends on the size or the model number, but is about 50 μm at maximum. The crowning portion 16c formed in the small end surface 14a is similar to the crowning portion 16b, and hence description thereof is omitted. The straight portion of the rolling surface of the tapered roller described in Description and Claims is referred to as a portion having a linear shape and a portion having a substantially linear shape with crowning having a drop amount of about several micrometers.

Next, with reference to FIG. 4 and FIG. 5, description is made of the cut crowning formed in at least the raceway surface 12a of the inner ring 12 out of the inner ring 12 and the outer ring 13. The raceway surface 12a of the inner ring 12 comprises, at a center portion thereof in the generating line direction, a crowning center portion 12r1 formed of a center curve C1 having a large curvature radius R4, and the crowning center portion 12r1 has a width LG1. The curvature radius R4 of the center curve C1 of the crowning center portion 12r1 is such an extremely large curvature radius that a drop amount of about 5 μm is given at each of both ends of the crowning center portion 12r1.

Cut crowning portions 12r2 and 12r3 are formed on both sides of the crowning center portion 12r1 in the generating line direction. Both a curvature radius R5 of an end portion curve C2 forming the cut crowning portion 12r2 and a curvature radius R6 of an end portion curve C3 forming the cut crowning portion 12r3 are smaller than the curvature radius R4 of the center curve C1. The crowning center portion 12r1 and each of the cut crowning portions 12r2 and 12r3 are connected to each other with a smooth curve. The cut crowning portion 12r2 has a width represented by LG2. The cut crowning portion 12r2 has a drop amount represented by Dc1. The cut crowning portion 12r3 has a width represented by LG3. The cut crowning portion 12r3 has a drop amount represented by Dc2. The drop amounts Dc1 and Dc2 are each set to a value required for preventing generation of an edge load under a high-load environment or a high-misalignment environment, for example, to a value of from about 15 μm to about 20 μm. The term "drop amount Dc" of the cut crowning described in Claims is a generic term referring to the drop amounts Dc1 and Dc2.

In this embodiment, illustration is given of the example case in which the cut crowning portions 12r2 and 12r3 formed on both sides of the crowning center portion 12r1 in the generating line direction, and the widths LG2 and LG3, the end portion curves C2 and C3, the curvature radii R5 and R6, and the drop amounts Dc1 and Dc2 of the cut crowning portions 12r2 and 12r3 are different from each other. However, the present invention is not limited to such a configuration, and there is a case in which some of or all of the cut crowning portions 12r2 and 12r3 and the widths LG2 and LG3, the end portion curves C2 and C3, the curvature radii R5 and R6, and the drop amounts Dc1 and Dc2 of the cut crowning portions 12r2 and 12r3 are the same.

As illustrated in FIG. 4, the raceway surface 12a of the inner ring 12 comprises ground relief portions 12f and 12g. Therefore, the raceway surface 12a has an effective raceway surface width represented by LG. The effective raceway surface width LG corresponds to a sum of the width LG1 of the crowning center portion 12r1 and the widths LG2, LG3 of the cut crowning portion 12r2, 12r3 on both sides.

In the foregoing, description is made of the crowning center portion 12r1 of the raceway surface 12a of the inner ring 12 and the cut crowning portion 12r2, 12r3 on both sides. However, when the cut crowning is formed in the raceway surface 13a of the outer ring 13, a configuration thereof is the same as that of the crowning of the inner ring 12. Thus, description thereof is omitted.

Next, with regard to the above-mentioned case in which the straight portion and the logarithmic crowning portions are formed in the rolling surface 16 of the tapered roller 14 and in which the crowning center portion and the cut crowning portions are formed in the raceway surface 12a of the inner ring 12, in Table 1, there is shown a test result as to a drop amount Dr (Dr3) at the logarithmic crowning end portion, the tangent angle α, the ease of processing, and a degree of change in contact surface pressure value with changes in ratio of the width LW1 of the straight portion of the tapered roller 14 to the effective raceway surface width LG of the inner ring 12.

A ratio LW/LG of the effective rolling surface width LW of the tapered roller, which is shown in Table 2 described later, to the effective raceway surface width LG of the inner ring is from about 1.1 to about 1.2. The ratio LW/LG is from about 1.1 to about 1.2. Moreover, LW1/LG=0.6 in Table 1 substantially corresponds to LW1/LW=0.5 in Table 2, and it is desired that the crowning be intensively formed in the tapered roller in the case of LW1/LG=0.6. Therefore, cut crowning is not required.

As shown in Table 1, in order to effectively reduce the contact surface pressure at the center portion, it is desired that the ratio LW1/LG of the width LW1 of the straight portion of the roller to the effective raceway surface width LG of the inner ring be equal to or larger than 0.7. In the tapered roller bearing 1 according to this embodiment, the drop amount of the logarithmic crowning portion of the tapered roller is set within a range which enables superfinishing, and insufficiency of the drop amount is supplemented with the related-art cut crowning of the inner ring or the outer ring. With this, processing can be performed even when the ratio LW1/LG is equal to or larger than 0.9. However, it has been found that, processing is difficult when the ratio LW1/LG is 0.95 because the tangent angle α at the roller end portion becomes excessively larger.

Now, description is made of the reason why the superfinishing is difficult when the tangent angle α at the tapered roller end portion becomes excessively larger. Although illustration is omitted, the superfinishing on the tapered roller is performed as follows. For example, the tapered roller is supported on guide threaded surfaces formed on a pair of feed drums, and the tapered roller is fed through the feed drums while being rotated. On this occasion, superfinishing is performed with a grinder on the roller outer peripheral surface. In order to perform the superfinishing on the straight portion and the logarithmic crowning portions of the tapered roller, a posture of the tapered roller is changed. The thread bottom angles of the guide threaded surfaces of the feed rums are changed for such purpose. However, when

TABLE 1

| Ratio of width LW1 of straight portion of roller to effective raceway surface width LG of inner ring (LW1/LG) | 0.6 | 0.7 | 0.8 | 0.85 | 0.9 | 0.95 |
|---|---|---|---|---|---|---|
| Drop amount Dr [μm] at roller end portion | 20 | 25 | 30 | 35 | 40 | 45 |
| Total drop amount Dr + Dc [μm] of crowning of roller and inner ring | 30 | 37 | 45 | 52 | 60 | 67 |
| Tangent angle α at roller end portion | 0°50' | 1° | 1°20' | 1°40' | 2° | 3° |
| Ease of processing | ○ | ○ | ○ | ○ | ○ | x |
| Necessity of cut crowning | x | ○ | ○ | ○ | ○ | ○ |
| Increase or decrease [%] in center surface pressure value | ±0 | 2% decrease | 3% decrease | 4% decrease | 5% decrease | 6% decrease |
| Determination | x | ○ | ○ | ○ | ○ | x |

The test shown in Table 1 was conducted based on comparison of the width LW1 of the straight portion of the tapered roller and the effective raceway surface width LG of the inner ring, and evaluation is made with different ratios LW1/LG. The reason thereof is based on the thought that, because the cut crowning is formed in the raceway surface of the inner ring, the ratio to the effective raceway surface width LG of the inner ring provides more suitable test result.

the tangent angle α of the tapered roller end portion becomes excessively larger, processing becomes more difficult.

Based on the test result described above, when the ratio LW1/LG is set within the range of 0.7≤LW1/LG<0.95, the contact surface pressure can be reduced, and generation of the edge road can be reduced. Moreover, ease of processing is excellent, and hence the manufacturing cost can be reduced.

Meanwhile, as a knowledge obtained in the course of development, in Table 2, there is shown a test result given in a case in which the raceway surface of the inner ring has a straight shape and in which the logarithmic crowning is formed only in the tapered roller.

TABLE 2

| | | | | | | |
|---|---|---|---|---|---|---|
| Ratio of width LW1 of straight portion to effective rolling surface width LW of roller (LW1/LW) | 0.45 | 0.5 | 0.7 | 0.8 | 0.85 | 0.9 |
| Drop amount Dr [μm] at roller end portion | 45 | 46 | 52 | 57 | 60 | 62 |
| Tangent angle α [°] at roller end portion | 1°10' | 1°20' | 1°30' | 1°40' | 2° | 3° |
| Ease of processing | ○ | ○ | ○ | ○ | ○ | x |
| Increase or decrease [%] in center surface pressure value | 1% increase | ±0 | 2% decrease | 3% decrease | 4% decrease | 5% decrease |
| Determination | x | ○ | ○ | ○ | ○ | x |

As shown in Table 2, in the case in which the logarithmic crowning is formed only in the tapered roller, when the ratio LW1/LW of the width LW1 of the straight portion to the effective rolling surface width LW of the roller becomes equal to or larger than 0.9, the tangent angle α at the roller end portion becomes excessively larger, with the result that processing becomes more difficult. Moreover, when the ratio LW1/LW is 0.45, the contact surface pressure at the center portion increases, with the result that such configuration is not applicable to a practical use.

A gap S, which is illustrated in FIG. 1, between the small end surface 14a of the tapered roller 14 and the small-flange surface 12d is set so as to be equal to or smaller than 0.4 mm. Therefore, the effect of suppressing skew can be attained. Further, the adapting rotation performed at the time of assembly of the tapered roller bearing 1 is reduced, thereby improving ease of assembly. The gap S described above is equal to or smaller than 0.4 mm for the size of, for example, the tapered roller bearing used for a transmission for an automobile. However, the gap S may be equal to or larger than 0.5 mm in the case of a tapered roller bearing having a larger size.

When a ratio (Dr+Dc)/Dw of a total drop amount Dr+Dc of the crowning of the roller and the inner ring to the roller diameter Dw illustrated in FIG. 2 and FIG. 4 is set so as to fall within a range of 0.003≤(Dr+Dc)/Dw≤0.03, the edge surface pressure can be set to an appropriate value. Moreover, ease of processing is excellent, and hence the manufacturing cost can be reduced. When the ratio (Dr+Dc)/Dw is smaller than 0.003, the edge surface pressure becomes larger. When the ratio (Dr+Dc)/Dw is larger than 0.03, the drop amount Dr becomes excessively larger, with the result that manufacture becomes more difficult.

As described above, in the tapered roller bearing 1 according to this embodiment, the drop amount of the logarithmic crowning portion of the tapered roller is set within a range which enables superfinishing, and the insufficiency of the drop amount is supplemented with the related-art cut crowning of the inner ring or the outer ring. With this, the following conspicuous effects can be attained. That is, a long straight portion can be secured. With this, the contact surface pressure can be reduced, and generation of the edge load can be suppressed. Moreover, ease of processing is excellent, and hence the manufacturing cost can be reduced.

Figure 6:
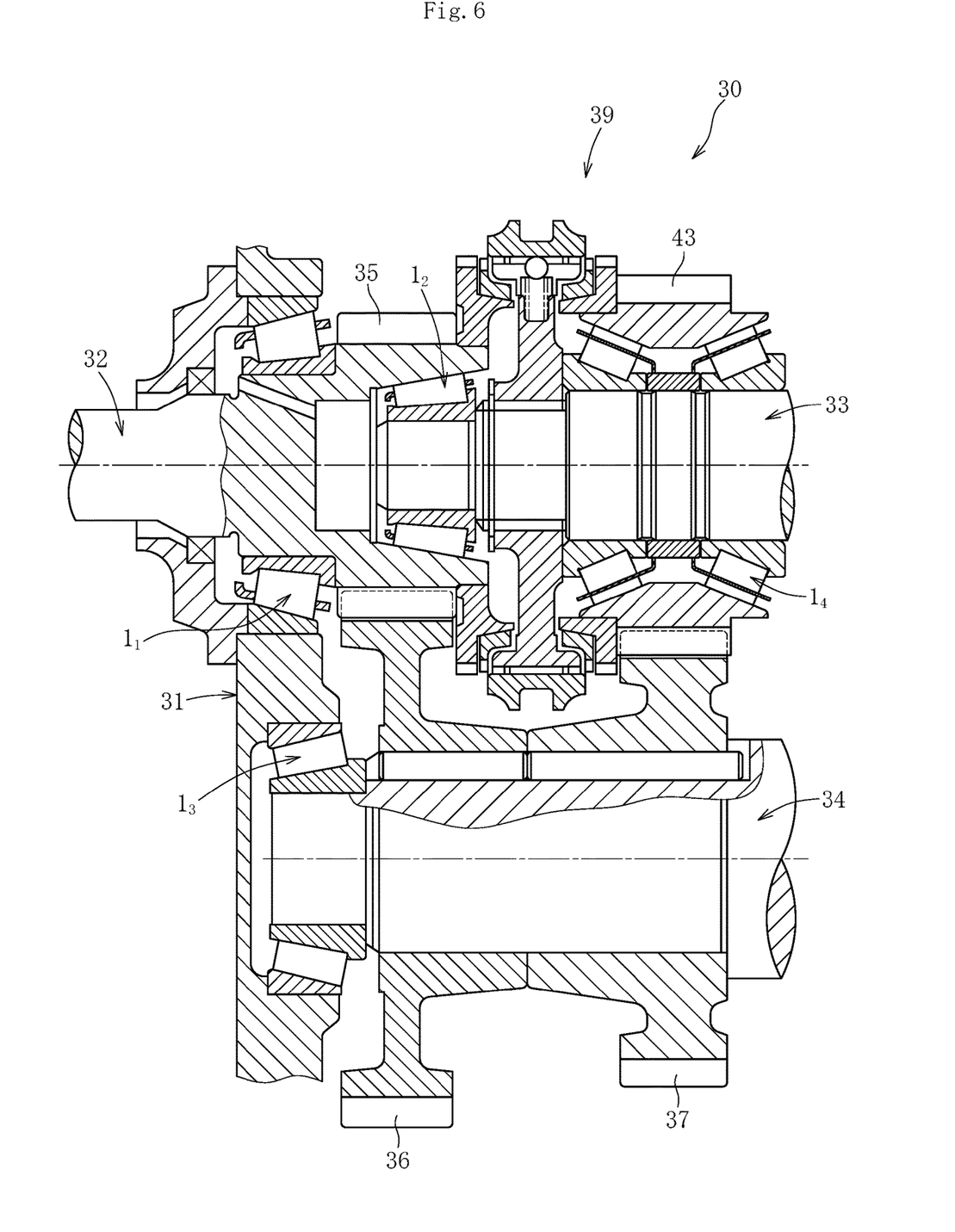
FIG. 6 is a vertical sectional view for illustrating a transmission for an automobile for which the tapered roller bearing of FIG. 1 is used.
Figure 7:
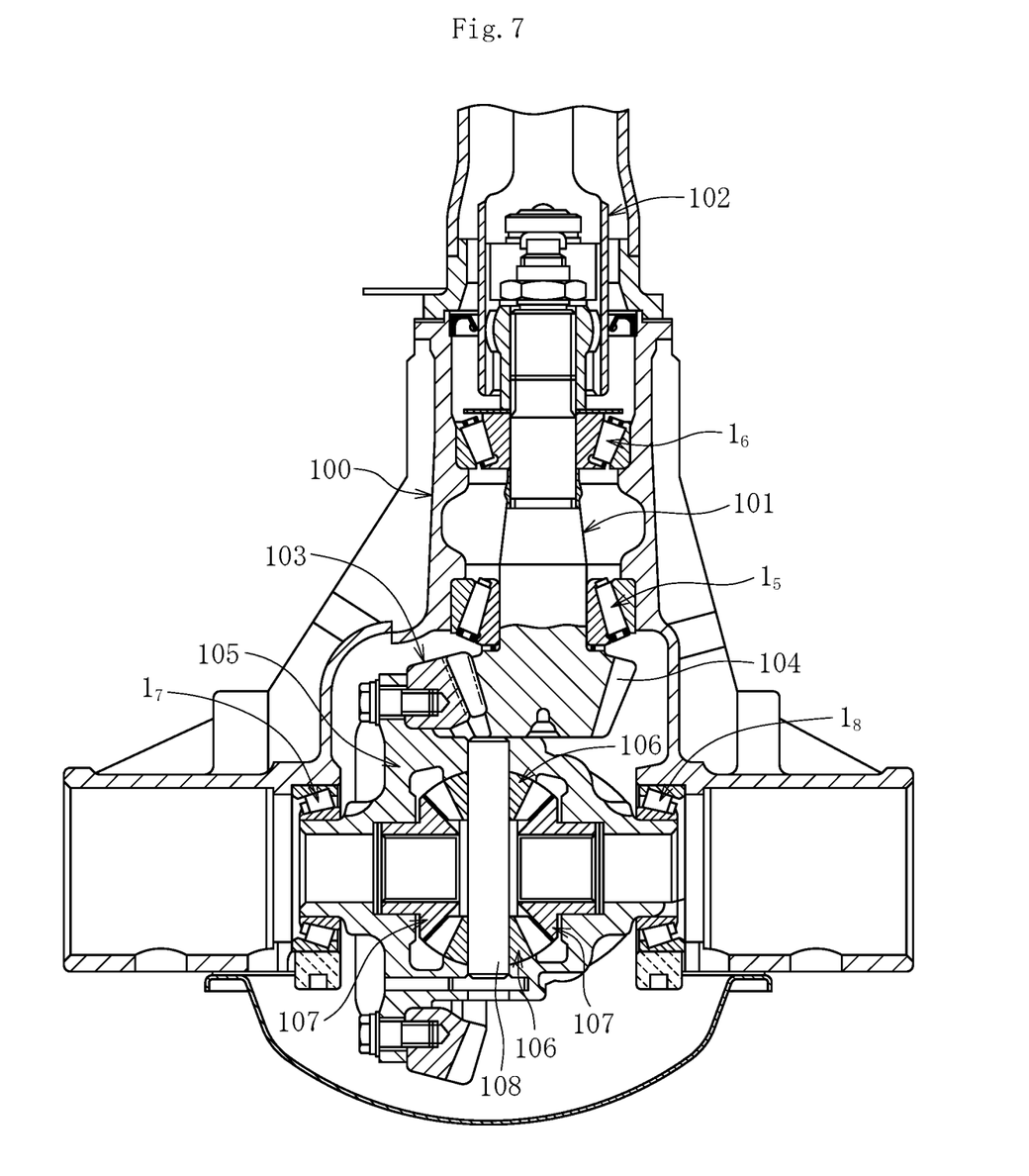
FIG. 7 is a vertical sectional view for illustrating a differential for an automobile for which the tapered roller bearing of FIG. 1 is used.

Finally, as suitable usage of the tapered roller bearing 1 according to this embodiment, with reference to FIG. 6 and FIG. 7, brief description is made of a transmission for an automobile and a differential for an automobile. FIG. 6 is a vertical sectional view for illustrating main parts of the transmission for an automobile. FIG. 7 is a vertical sectional view for illustrating the differential for an automobile.

A transmission 30 illustrated in FIG. 6 is an example of a synchromesh speed changer. An input shaft 32 is supported so as to be rotatable by a mission case 31 through intermediation of a tapered roller bearing $1_1$, and a main shaft 33 is arranged coaxially with the input shaft 32. The input shaft 32 and the main shaft 33 are supported so as to be relatively rotatable by a tapered roller bearing $1_2$ at a pilot portion. Although illustration is omitted, other parts of the main shaft 33 are also supported by tapered roller bearings. An auxiliary shaft 34 which is arranged so as to be parallel to the input shaft 32 and the main shaft 33 and apart therefrom by a predetermined distance is supported by a tapered roller bearing $1_3$ and another tapered roller bearing (not shown). The input shaft 32 has an input shaft gear 35 formed integrally therewith, and always meshes with an auxiliary shaft gear 36 of the auxiliary shaft 34.

A main shaft gear (hereinafter simply referred to as "gear") 43 is mounted to the main shaft 33 so as to be rotatable through intermediation of a tapered roller bearing $1_4$ at an idler portion. The main shaft gear 43 always meshes with a gear 37 of the auxiliary shaft 34. The tapered roller bearing according to this embodiment corresponds to each of the tapered roller bearings $1_1$ to $1_4$ described above and other tapered roller bearings (not shown). A synchronization mechanism 39 moves in the axial direction (right-and-left direction in FIG. 6) by actuation of a selector (not shown) so that a speed-changing operation is performed.

Next, with reference to FIG. 7, description is made of the differential. FIG. 7 is a vertical sectional view of a general differential for an automobile. A drive pinion shaft 101 is received on an input side of a differential case 100, and is supported by a pair of tapered roller bearings $1_5$ and $1_6$ so as to be rotatable. A propeller shaft 102 is coupled to one end portion of the drive pinion shaft 101, and a drive pinion gear (deceleration small gear) 104 which meshes with a link gear (deceleration large gear) 103 is integrally provided to another end portion of the drive pinion shaft 101.

The link gear 103 is coupled to a differential gear case 105, and the differential gear case 105 is supported by a pair of tapered roller bearings $1_7$ and $1_8$ so as to be rotatable relative to the differential case 100. A pair of pinion gears 106 and a pair of side gears 107, which mesh with the pair of pinion gears 106, are arranged inside the differential gear case 105. The pinion gears 106 are mounted to a pinion shaft 108, and the side gears 107 are mounted to the differential gear case 105. Right and left drive shafts (not shown) are coupled (for example, by serration coupling) to radially inner portions of the side gears 107. The tapered roller bearing according to this embodiment corresponds to each of the tapered roller bearings $1_5$ to $1_8$ described above. Drive torque of the propeller shaft 102 is transmitted through the drive pinion gear 104, the link gear 103, the differential gear case 105, the pinion gears 106, the side gears 107, and the drive shafts in the stated order.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST

1 tapered roller bearing
12 inner ring
12a raceway surface
12b small-flange portion
12c large-flange portion
12d small-flange surface
12e large-flange surface
12f ground relief portion
12g ground relief portion
12r1 crowning center portion
12r2 cut crowning portion
13 outer ring
13a raceway surface
14 tapered roller
14a small end surface
14b large end surface
15 retainer
16 rolling surface
16a straight portion
16b logarithmic crowning portion
16c logarithmic crowning portion
C1 center curve
C2 end portion curve
Dc drop amount of cut crowning portion
Dr drop amount at logarithmic crowning end portion
Dw roller diameter
LG effective raceway surface width
LG1 width of crowning center portion
LG2 width of cut crowning portion
LW effective rolling surface width
LW1 width of straight portion
S gap

The invention claimed is:

1. A tapered roller bearing for a transmission or a differential, the tapered roller bearing comprising:
    an inner ring comprising a raceway surface having a tapered shape on an outer periphery;
    an outer ring comprising a raceway surface having a tapered shape on an inner periphery;
    a plurality of tapered rollers incorporated into a space defined between the raceway surfaces; and
    a retainer configured to receive the plurality of tapered rollers,
    wherein at least the raceway surface of the inner ring comprises cut crowning of a complex curve comprising:
        a center curve, which is formed at a center portion in a generating line direction of the raceway surface; and
        end portion curves, which are formed on opposite sides of the center curve in the generating line direction of the raceway surface, each of the end portion curves having a curvature radius smaller than a curvature radius of the center curve,
    wherein the tapered rollers each have a rolling surface comprising:
        a straight portion, which is formed at a center portion in a generating line direction of the rolling surface; and
        logarithmic crowning portions, which are formed on opposite sides of the straight portion in the generating line direction of the rolling surface, and
    wherein, when the raceway surface of the inner ring has an effective raceway surface width represented by LG, and the straight portion of the rolling surface of each of the tapered rollers has a width represented by LW1, $0.7 \leq LW1/LG < 0.95$ is satisfied, and
    wherein, when the logarithmic crowning portions have a drop amount represented by Dr, each of the tapered rollers has a diameter represented by Dw, and the cut crowning of the raceway surface of the inner ring has a drop amount represented by Dc, $0.003 \leq (Dr+Dc)/Dw \leq 0.03$ is satisfied.

* * * * *